United States Patent [19]

Rettig

[11] 3,769,564

[45] Oct. 30, 1973

[54] METHOD AND MEANS FOR LIMITING THE MAXIMUM HORSEPOWER OUTPUT OF A SELF-EXCITED ALTERNATING CURRENT MOTOR

[75] Inventor: Charles E. Rettig, Brookfield, Wis.

[73] Assignee: The Louis Allis Company, Milwaukee, Wis.

[22] Filed: Aug. 30, 1972

[21] Appl. No.: 284,856

[52] U.S. Cl.................. 318/227, 318/230, 318/231
[51] Int. Cl. .......................................... H02p 5/40
[58] Field of Search.................... 318/227, 230, 231; 321/5

[56] References Cited
UNITED STATES PATENTS

| 3,500,158 | 3/1970 | Landau et al...................... | 318/227 |
| 3,512,067 | 5/1970 | Landau............................... | 318/227 |
| 3,593,083 | 7/1971 | Blaschke........................... | 318/227 |
| 3,612,971 | 10/1971 | Blaschke........................... | 318/227 |

Primary Examiner—Gene Z. Rubinson
Attorney—Alan C. Rose et al.

[57] ABSTRACT

A method and means for controlling the horsepower output of a self-excited alternating current motor of the induction or synchronous reluctance type. In connection with an induction motor, the method includes the steps of generating a slip frequency in the motor proportional to the desired output torque condition while simultaneously establishing the magnitude and phase displacement of the stator current at preselected values, and, at rotor speeds at predetermined magnitude, simultaneously adjusting the slip frequency in the motor to maintain a constant horsepower output as motor speed increases. Analogous steps are carried out to control a torque of a synchronous reluctance motor. The means comprises a motor control having a frequency control means for providing a stator current of a desired frequency and phase displacement to the motor, a power supply means for regulating the magnitude of the stator current to a predetermined value, a speed control means, and a means for limiting the horsepower output of the motor at motor speeds above a predetermined value.

6 Claims, 3 Drawing Figures

METHOD AND MEANS FOR LIMITING THE MAXIMUM HORSEPOWER OUTPUT OF A SELF-EXCITED ALTERNATING CURRENT MOTOR

CROSS-REFERENCE TO APPLICATION

This application is related to a commonly owned application by the same inventor, Charles E. Rettig, entitled "Method and Means for Controlling the Output Condition of a Self-Excited Alternating Current Motor" filed Oct. 20, 1970, Ser. No. 82,302, the subject matter of which is hereby incorporated by reference.

BACKGROUND OF THE INVENTION

The present invention relates to the control of self-excited alternating current motors and, more particularly, to the torque control and limitation of the maximum horsepower output of such motors.

Self-excited alternating current motors, for example, induction or synchronous reluctance motors, possess the highly desirable qualities of design simplicity and mechanical ruggedness. However, such motors can be abused by overloading them and can suffer physical damage as a result of overloading.

To some extent, the difficulty in controlling such motors results from the same mechanical simplicity which increases their utility. Self-excited alternating current motors consist of a flux producing stator winding distributed in a stotor core surrounding a cage of rotor current conductors and shorting end rings embracing a rotor core. In a synchronous reluctance motor the rotor core has variable reluctance flux paths. In either case there is no direct electrical connection to the rotor, as by commutators, slip rings or the like. While the absence of commutators or slip rings and brushes eliminates the numerous problems associated therewith, the lack of electrical connection to the rotor also prevents direct control of electrical conditions in the rotor, such as limiting the horsepower developed. The electrical condition of the rotor can be controlled only indirectly by the energization of the stator winding.

SUMMARY OF THE INVENTION

The motor control method and circuit of the present invention employs current control to obtain direct regulation of the output torque condition and to limit the maximum horsepower output of a self-excited alternating current motor. By novel use of the stator voltage in the motor, the present invention limits the horsepower output of the motor to a substantially constant value over the entire operating range of speeds of the motor.

The present invention controls and limits the horsepower output of the motor by utilizing the stator voltage as an indication of horsepower output or, more particularly defined, torque per ampere output of the motor at all speeds. The rotor current and motor torque are proportional to the slip frequency developed in the motor. A horsepower output of the motor is limited to a substantially constant maximum at all speeds above a predetermined value by adjusting the slip frequency to a magnitude higher than it otherwise would have been thereby causing a corresponding reduction in motor torque and limiting the maximum horsepower output of the motor.

DESCRIPTION OF THE PREFERRED EMBODIMENT

Figure 1:
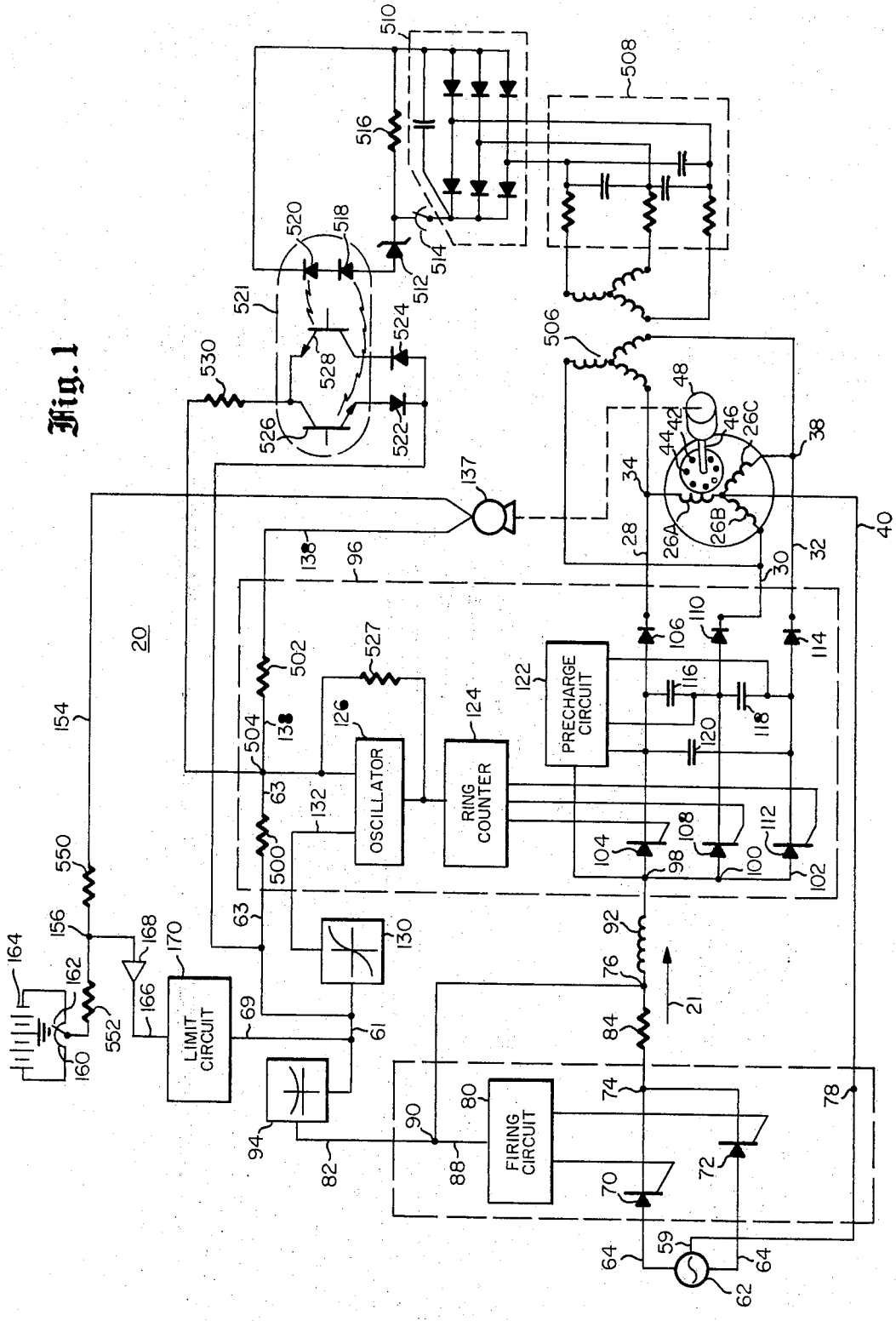
FIG. 1 is a schematic diagram of one embodiment of the self-excited alternating current motor horsepower output control of the present invention.

In the following discussion and in the drawings, the improvement to the present invention over this device disclosed in the referenced patent application is referred to using reference numerals 500 and above.

The operative condition of a self-excited alternating current motor of the induction type may be defined by considering the relative magnitude and phase displacements of the rotor current, the motor mutual flux and corresponding exciting current, and the stator current. Under conditions of constant motor flux, the rotor current bears a substantially fixed phase relationship with the flux producing exciting current. Furthermore, the rotor current and motor torque are proportional to the slip frequency developed in the motor. The motor flux may be maintained constant by controlling the magnitude of the stator current as a function of the motor slip frequency. Additionally the response of the motor may be greatly improved by controlling the phase displacement of the stator current with respect to the exciting current as a function of the slip frequency.

The motor slip frequency to which the foregoing factors are proportional or related is generated by establishing the frequency of the stator current energization at a value equal to the algebraic summation of the rotor frequency and a slip frequency proportional to the output torque to be produced. Simultaneously, the magnitude of the stator current is established at a level which retains the motor flux constant as the desired output torque condition is developed. The phase displacement of the stator current may also be altered as a function of slip frequency to maintain constant motor flux while permitting immediate generation of the rotor current in its proper, torque producing phase displacement relative to the exciting current. A current regulated power supply and a frequency control means, such as an inverter, may be employed for the foregoing purposes.

The above mentioned slip frequency may be generated by applying a stator current of a fixed frequency to the stator winding and allowing the torque load applied to the motor to alter the rotor speed by the amount necessary to obtain the required slip frequency. In cases in which the speed of the motor rotor is relatively constant, the required slip frequency may be generated by altering the frequency of the stator current energization.

To control a synchronous reluctance motor, the frequency of the stator current energization is established at a value equal to the value of the existing rotor frequency and both the magnitude and phase displacement of the stator current are varied to obtain the torque producing quadrature axis flux while maintaining the direct axis flux at a substantially fixed value.

The output torque condition of the motor may be controlled, responsive to a speed error signal, for providing speed regulation to the motor.

Inasmuch as motor control 20 is directed to the limitation of the maximum horsepower in controlling the torque of separately excited alternating current motors, the Description of the Preferred Embodiment incorporates by reference the disclosure of the torque and motor control in the referenced patent application.

An alternating current induction motor 22 is used for illustrative purposes in describing the operation of the motor control. As shown in FIG. 1, alternating current motor 22 includes a stator 24 of conventional laminated iron core construction having polyphase winding 26 disposed therein for generating a revolving magnetic flux when energized. Stator winding 26 includes stator coils 26A, 26B, and 26C interconnected to form a conventional star connected stator winding. Stator coils 26A, 26B, and 26C are energized by supply lines 28, 30, and 32 connected to the corresponding motor input terminals 34, 36 and 38. A neutral conductor 40 is connected to the center tap of star connected stator winding 26.

Stator 24 surrounds rotor 42 having rotor conductors 44 circumferentially spaced in a laminated iron core. The rotor output shaft 46 is connected to the load 48 of motor 22.

Motor control 20 is operable to provide a desired output torque condition of motor 22 in response to an input torque command signal corresponding to the desired output torque condition. Since the desired output torque condition is proportional to slip frequency, the input signal is also proportional to slip frequency. This torque command signal may be selected by manipulation of a signal means or control device shown diagrammatically as potentiometer 160. Potentiometer 160 is energized by a center grounded battery 65. The wiper 67 of potentiometer 160 provides the torque command signal in conductor 69.

Control 20 is energized from a source of alternating current power 62 which typically supplies 60 Hertz power mains 64. Power source 62 is connected to current regulated power supply 66 through power mains 64 and center tap conductor 66. Supply 66 may include a full wave rectifier 68 having the anodes of controlled rectifiers or thyristors 70 and 72 connected to power mains 64. The cathodes of the controlled rectifiers are connected to output terminals 74 and conductor 76. The direct current output of supply 64 appears at output terminal 74 and at output terminal 78 located between conductor 66 and conductor 40. The arrow identified by the number 21 indicates the output current of supply 66 and its direction of flow out of output terminal 74 and into output terminal 78.

The magnitude of the direct current 21 provided by power supply 66 is controlled by firing circuit 80 which supplies signals to the gate terminals to the controlled rectifiers. Firing circuit 80 may be any firing circuit suitable for providing firing signals to the controlled rectifiers at desired firing angles, responsive to a current reference signal in conductor 82 and to one or more current feedback signals applied to the firing circuit. For example, firing circuit 80 may be a biased sine wave, phase shift firing circuit such as is shown on page 434 of J. Millman and S. Seely, Electronics (1941).

A simplified current regulation circuit is exemplarily shown in connection with supply 66 in FIG. 1 including an output current sensing means, such as resistor 84 in conductor 76 which provides a feedback signal corresponding to the actual output current 21 of supply 66 in conductor 86. The signal in conductor 86 is compared with the signal corresponding to the desired current in conductor 82 at summing junction 88 and a current error signal provided in conductor 90 to firing circuit 80. The regulation provided by the aforementioned feedback signal and circuitry causes the actual output current of supply 66 to approach the desired current as selected by the reference signal in conductor 82.

An inductor or choke 92 is interposed in conductor 76 to prevent any rapid changes in the magnitude of direct current 21, to absorb short duration voltage transients, and to smooth out the current produced in the power supply. Current regulated power supply 66 and inductor 92 thus form a current source which provides current 21 of the desired magnitude in conductor 77 to the remaining portions of motor control 20.

The magnitude of current 21 is determined by function generator 94. As is generally defined in the art, and is used herein, a function generator comprises circuitry for providing an output signal which is a given function of the input signal. This may include simple proportionality as well as more complex relationships. Function generator 94 has as its input signal, the torque command signal from potentiometer 160 in conductor 61 and provides an output signal to firing circuit 80 in conductor 82 for providing current 21 from current regulated direct current power supply 66 corresponding to the magnitude of stator current $I_s$ necessary both to maintain the exciting current constant and offset the effect of the rotor current so as to provide the output torque condition of rotor 22 commanded by the torque command signal. Thus, function generator 74 relates motor torque as evidenced by the torque command signal to stator current $I_s$, as the output signal in conductor 82, so that the relation or function between the input signal and output signal of function generator 94 may be shown by the graph 50 of FIG. 5 of the referenced patent application. Since the torque command signal may command either motoring or regenerative torque, the function of function generator 94 resembles the graph 50 of FIG. 9. The graph is reproduced in the block schematically representing function generator 94 in FIG. 1. As an alternative, the signal applied to function generator 94 may be rendered unipolar so that the graph 50 of FIG. 5 of the referenced patent application represents the function of function generator 94.

Numerous types of circuits may serve as function generator 94. For example, a plurality of resistors providing the output signal in conductor 82 may be selectively connected, as by breakover diodes, as the magnitude of the torque command input signal varies to provide the desired relationship between the input and output signals of function generator 94.

Motor control 20 must also contain a frequency control means. In the embodiment of motor control 20 shown in FIG. 1, such a means comprises an inverter 96 for inverting direct current 21 into alternating current for application to stator winding 26 of motor 22 as stator current $I_s$. It has been found highly desirable to use the trapped charge or capacitor commutated, diode isolated inverter 96 shown in FIG. 1 for this purpose.

Inverter 96 comprises three parallel current paths 98, 100, and 102 extending between conductor 76 and output conductors 28, 30, and 32. Controlled rectifier 104 and diode 106 are connected in series in current path 98. Controlled rectifier 108 and diode 110 are connected in series in current path 100 and controlled rectifier 112 and diode 114 are connected in series in current path 102.

A commutating capacitor is connected across each pair of current paths to effect turn off of the controlled rectifiers 104, 108 and 112. Capacitor 116 is connected across current paths 98 and 100, capacitor 118 is connected across current paths 100 and 102, and capacitor 120 is connected across current paths 98 and 102. To assist in the start up of inverter 96, a precharge circuit 122 is connected to the capacitors and to conductor 77.

Controlled rectifiers 104, 100 and 102 are fired, or rendered conductive, by a firing means which may typically consist of ring counter 125 and oscillator 126. Oscillator 126, which may be of the capacitor controlled, unijunction transistor relaxation type, generates a series of firing pulses to ring counter 124. The frequency of generation of these pulses is dependent on the two factors represented in two separate signals or in one combined signal applied to oscillator 126. One of these signals is provided from tachometer generator 137 in conductor 138. Tachometer generator 137 is connected to output shaft 46 and provides a signal in conductor 138 proportional to the rotor frequency of rotor 42, which causes oscillator 126 to generate pulses at a frequency corresponding to the rotor frequency $f_r$ of rotor 42. The second of these signals is the torque command signal from potentiometer 160 which increases or decreases the rate of pulse generation by the amount of the desired slip frequency $f_s$ in motor 22. Speed control of alternating current motors is discussed below. The rate of pulse generation is increased during motoring operation and decreased during regenerative operation. The sum of the rotor frequency $f_r$ of rotor 42 and the slip frequency $f_s$ of motor 22 thus equals the electrical frequency $f_e$ of the cyclical current applied to stator winding 26 by inverter 96. The separate signals in conductors 63 and 138 may be combined in a single conductor, if desired.

Ring counter 124 distributes the firing pulses of oscillator 126 to controlled rectifiers 104, 108 and 112 in a desired sequence. The desired sequence may be as above, or it may be the reverse, i.e. controlled rectifiers 112, 108 and 104. The sequence in which the controlled rectifiers are fired determines the sequential energization of the stator coils of motor 22 and the direction of rotation of the rotating magnetic flux of motor 22, shown by the vector $I_m$ in FIG. 3 of the referenced patent application. Ring counter 124 may be of the type shown on page 4-4 of Application Memos, published by the Signetics Corp., Sunnyvale, Calif., 1968.

Inverter 94 effects commutation by current transfer, that is, by transferring current out of one of the parallel current paths into another current path. It may be assumed that controlled rectifier 104 is in the conductive state and is supplying current 21 from output terminal 74 of power supply 66 through diode 106 to conductor 28 and stator coil 26A. It may also be assumed that capacitor 116 and capacitor 120 have been charged such that a positive potential exists on the common connection of the cathode of controlled rectifier 104, the upper plates of capacitors 116 and 120 and the anode of diode 106.

To effect the transfer of current 21, from current path 98 to current path 100, controlled rectifier 108 is fired on. When controlled rectifier 108 is fired on, the current in controlled rectifier 104 is extinguished by the voltage on capacitors 116 and 120. Controlled rectifier 104 is thus commutated off by capacitors 116 and 120. The current 21 from power supply 66 then flows through controlled rectifier 108 but remains momentarily unchanged through diode 106, capacitors 116, 118 and 120 and a stator coil 26A. Current flow through capacitor 116 from controlled rectifier 108 to diode 106, discharges capacitor 116, causing its voltage to go through zero and to build up in the opposite polarity. As the voltage on capacitor 116 becomes equal to the voltage between conductors 28 and 30, diode 110 becomes unblocked and the voltage on capacitor 116 is applied to stator coils 26A and 26B. This initiates current flow in conductor 30 and stator coil 26B and commences the transfer of current from stator coil 26A to 26B. The transfer of current from stator 26A to 26B of motor 22 proceeds at an increasing rate as the voltage on capacitor 116 continues to build up due to the stator coil 26A current still flowing through it. Finally, the complete current 21 from power supply 66 is transferred or commutated into stator coil 26B, leaving capacitor 116 charged with a very substantial negative potential at the upper plate and a corresponding positive potential at the lower plate, due to the leakage reactance stator winding 26 of the motor 22.

During the above described commutation, at the same time current is flowing through capacitor 116, current is also flowing serially through capacitor 118 and capacitor 120 so that at the completion of the commutation, capacitor 118 has been charged with its upper plate positive and its lower plate negative. This charge and the charges on capacitors 116 and 120 are retained on the capacitors by the blocking, or isolating, action of the associated diodes.

When controlled rectifier 112 is fired on, capacitors 116 and 118 effect the turn off of controlled rectifier 108 and the commutation of current from stator coil 26B to 26C in a manner similar to that described above. When controlled rectifier 104 is fired, capacitors 118 and 120 effect the turn off of controlled rectifier 112 and the commutation of current 21 from stator coil 26C to 26A.

Figure 3:
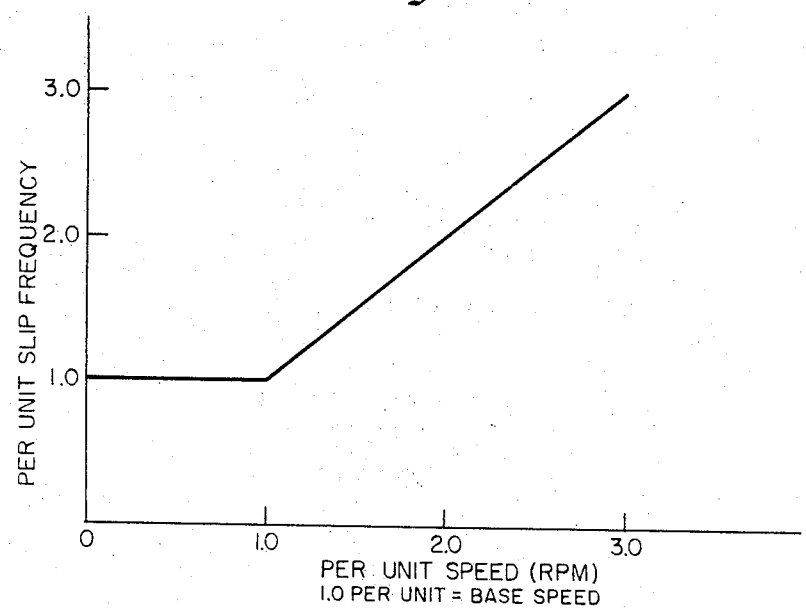
FIG. 3 is a graph showing the relationship between the slip frequency as a motor and motor speed.

The operation of motor control 20 to produce the operative condition in motor 22, as shown in FIGS. 3, 4, and 6 of the referenced patent application, will now be explained. As noted above, FIG. 3 of the referenced patent application shows the no output torque operating state of motor 22 in which rotor 42 is rotating in synchronism with vector $I_m$ of motor 22 driven, for example, by the inertia of load 48. In the no torque operating state, no output torque is being requested of motor 22 and no torque command signal from potentiometer 160 will appear in conductors 61 and 63 or will be applied to function generator 94 and oscillator 126. The signal in conductor 138 from tachometer generator 137 causes oscillator 126 to generate pulses at a frequency corresponding to the rotor frequency of motor 22 so that no slip frequency appears in motor 22.

Function generator 94 will provide an output signal in conductor 82 to firing circuit 80 calling for a current 21 from power supply 66 and a stator current $I_s$ to motor 22 having a per unit value of 1. This is in accordance with the graph of FIG. 9 of the referenced patent application which indicates that for the no output torque condition of motor 22 the stator current $I_s$ must have a per unit value of 1. The exciting current $I_m$ is coequal with the stator current $I_s$ and also has a per unit value of 1.

Inverter 96 periodically and sequentially applies current 21 to stator coils 26A, 26B and 26C as stator current $I_s$ at a frequency corresponding to the rotor frequency. For purposes of analysis, the fundamental component of the square wave pulses may be assumed to be applied. The fundamental currents generate the rotating magnetic flux of motor 22. No fundamental rotor current $I_r$ is induced in rotor conductors 44 so that the above described energization of motor 22 by motor control 20 produces the operating conditions shown in FIG. 3 of the referenced patent application.

It may now be assumed that potentiometer 160 is adjusted to provide a torque command signal to motor control 20 and, more specifically, a torque command signal calling for a motoring output torque condition of motor 22 of rated torque. This is an output torque having a per unit value of 1. A torque command signal may be directed via conductor 61 to function generator 94. For purposes of discussion, it will be temporarily assumed that for motoring torques a positive voltage signal appears in conductor 61. In accordance with the operation of function generator 94, as shown graphically in FIG. 9 of the referenced patent application, function generator 94 provides a current reference signal in conductor 82 calling for a stator current having a per unit value of 2.7 and current regulated power supply 66 provides a direct current 21 having such a magnitude.

The torque command signal in conductor 63 is supplied to oscillator 126 to raise the pulse generation rate of oscillator 126. The rate of pulse generation and the speed of rotation of the motor magnetic flux is increased by an amount which will generate the desired slip frequency in motor 22, the speed of rotor 42 remaining instantaneously the same. As shown by the graph of FIG. 9 of the referenced patent application, the increase in the rate of pulse generation of oscillator 126 must be such as to generate a slip frequency in rotor 42 of 2.3 Hertz. Since the relationship between the motor torque, i.e., the torque command signal, and slip frequency is linear, as shown by the fact that both quantities are plotted on the abscissa of the graph of FIG. 9 of the referenced patent application, no function generator need be interposed between potentiometer 160 and inverter 96.

With a slip frequency now appearing in rotor 42, a rotor current will be generated in the rotor and an output torque will be generated by motor 22 as the exciting current $I_m$ and rotor current $I_r$ subtend the angular displacement with respect to the stator current $I_s$ which establishes the vector relationship necessary to both maintain the exciting current $I_m$ constant and offset the effect of the rotor current $I_r$. When the necessary angular displacement is achieved, the rated torque having a per unit value of 1 is provided from motor 22. The application of a per unit stator current $I_s$ of 2.7 insures that the exciting current $I_m$ remains constant.

When the torque command signal is adjusted to provide other output torque conditions, an analogous operation of motor control 20 occurs. For example, when potentiometer 160 is altered to increase the torque command signal to request an output torque condition having a per unit value of 2, the signal in conductor 61 causes function generator 94 and current regulated power supply 66 to provide a current 21 having a per unit value of approximately 5. The signal in conductor 63 causes oscillator 126 and inverter 96 to generate slip frequency of 4.7 Hertz in motor 22, resulting in the production of twice the rate torque when the appropriate displacement angle $\theta$ has been displaced in motor 22.

Operation of motor control 20 in the regenerative mode to produce a retarding torque on rotor 42 is also accomplished in a manner analogous to that described above. To proceed from the no torque condition, shown in FIG. 3 of the referenced patent application, to the application of a retarding torque equal to the rated torque of motor 22, potentiometer 160 is manipulated to provide a negative voltage signal in conductors 61 and 63. The signal so generated in conductor 61 causes function generator 94 to again generate a current 21 having a per unit value of 2.7 since, as shown in the graph of FIG. 9 of the referenced patent application, the same magnitude of input signal in conductor 61 will produce the same value of current value 21 regardless of the polarity of the signal from potentiometer 160.

However, the torque command signal in conductor 63 causes oscillator 126 to reduce the rate of pulse generation and the speed of rotation of the motor magnetic flux. This causes a slip frequency to appear in motor 22. However, the direction of rotation of rotor 42 relative to rotating magnetic flux is opposite from that appearing under motoring conditions since the rotor is rotating faster than the magnetic flux rather than slower. The rate of pulse generation of oscillator is reduced so that a slip frequency of 2.3 Hertz appears in motor 22. The application of a per unit stator current $I_s$ of 2.7 and a slip frequency of 2.3 Hertz causes rated torque to again be generated in motor 22 when the appropriate angular relationship between the rotor current $I_r$, the exciting current $I_m$ and the stator current $I_s$ is formed. However, because of the reversal of the direction of relative rotation between the motor magnetic field and rotor 42, the torque is a retarding torque, rather than an accelerating torque, so that motor 22 acts as an electrical source rather than as an electric load and braking of rotor 42 occurs.

The current regulating circuitry of power supply 66 operates to automatically maintain current 21 at the desired level regardless of the voltage of inverter 96, and will provide from power supply 66 a voltage of the magnitude and polarity necessary to so maintain the current. Under conditions in which the voltage at the terminals of inverter 96 has reversed, the current regulating circuitry of power supply 66 will cause the voltage of the power supply to reverse so that the power supply becomes an electrical load for motor 22 as a source. This effects regenerative operation.

Improved operation of motor control 20 may be obtained by including an optional function generator, as shown in FIG. 1. The optional function generator 130 is interposed between potentiometer 160 and oscillator 126 and provides a signal in conductor 132 to the latter element which controls the time of generation of the firing pulses by oscillator 126 but does not alter the rate of generation of firing pulses. This may be accomplished by varying the charge on the oscillator capacitor. The signal in conductor 132 thus serves to advance or retard the generation of the firing pulses to inverter 96.

The input signal to function generator 130 is the torque command signal in conductor 63 and the function obtained in function generator 130 is that of relating the magnitude of the torque command input signal to the amount by which the firing pulses of oscillator 126 are advanced or retarded by the output signal of function generator 130. The purpose for so doing is to effect a change in the position of the vector $I_s$, with respect to its no torque position, i.e., with respect to vector $I_m$, as shown in FIG. 6, as a function of the torque command input signal. The function of function generator 130 is that of the angular displacement $\theta$ which function is displayed by plot 52 on the graph of FIG. 9 of the referenced patent application for both motoring and regenerative operation and in the block in FIG. 11 of the referenced patent application schematically representing function generator 130.

The signal in conductor 63 is also supplied directly to oscillator 126 so as to vary the rate of pulse generation of oscillator 126 in the manner described above.

The operation of motor control 20 in the no torque condition in which rotor 42 is rotating synchronously with the rotating magnetic flux of motor 22 is the same as that described above. Since there is no torque command signal in conductor 63, there is no signal in conductor 63 which would alter the rate of pulse generation of oscillator 126. The absence of an input signal to function generator 130 prevents the generation of an output signal in conductor 132 which would advance or retard the application of the firing pulses of oscillator 126 to inverter 96.

When potentiometer 160 is adjusted to provide a torque command signal to motor control 20 calling for the rated output torque condition in the motoring direction, the operation of function generator 94 and current regulated power supply 66 is the same as described above to supply current 21 and stator current $I_s$ having a per unit value of 2.7. The torque command signal in conductor 63 is applied to oscillator 126 to raise the rate of pulse generation of pulse generator 126 and the slip frequency in rotor 42 to 2.3 Hertz. As noted above, the energization of motor 22 will effect the generation of the rated output torque condition in motor 22 when the desired vector relationship is formed by the operation of motor 22.

This time delay is avoided in motor control 20 by the inclusion of function generator 130 which, responsive to a torque command signal in conductor 63, immediately advances the generation of firing pulses of oscillator 126, the application of current pulses to stator coils 26A, 26B and 26C, and the angular displacement of the stator current $I_s$ so that the desired angular displacement of vector $I_s$ from the no torque position is immediately obtained in motor 22. This results in rated motor torque likewise being instantaneously generated.

The above described phase displacement of the stator current $I_s$ by altering the phase displacement of the current pulses applied to stator winding 26 by inverter 96 is more completely shown in FIG. 12 of the referenced patent application.

The following paragraphs deal with the speed control of self-excited alternating current motors. By virtue of the precise control of the motor output torque condition obtainable by the motor control, the speed of the motor may also be controlled in both the motoring and regenerative operating modes. The temporary assumption that the torque command signal from potientometer 160 appears directly on conductor 61 will now be dropped. This control of speed is obtained by making the torque command signal proportional to a speed error signal. For this purpose a speed feedback signal is provided from the motor as typically shown in motor control 20 of FIG. 1. In the case of an induction motor 22, the rotor frequency signal in conductor 138 may conveniently be made to function as a speed feedback signal or a separate speed feedback signal may be developed in conductor 154. The signal in conductor 154 is applied to summing junction 156 where it is compared with a speed reference signal in conductor 158 generated by wiper 160 of potentiometer 162 energized by battery 164. A speed error signal is thus produced in conductor 166 which may be utilized as the torque command signal.

The speed error signal in conductor 166 may be amplified by amplifier 168, the gain of which determines the accuracy of speed regulation. The error signal is applied to limit circuit 170 for limiting the magnitude of the error signal to obtain important control features, hereinafter described. Limit circuit 170 may include a breakover diode means for limiting the magnitude of the error signal. The output signal of limit circuit 170 in conductor 69 is provided as the input signal to function generator 94 and to the inverter 96.

In operation, potentiometer 160 is adjusted to provide, at wiper 162 and in conductor 158, a speed reference signal corresponding to the desired speed of motor 22. Tachometer generator 137 provides, in conductor 154, a signal proportional to the actual speed of rotor 42 of induction motor 22 controlled by motor control 20C. The difference between the signals in conductors 154 and 158 is determined at summing junction 156 and a speed error signal is provided therefrom in conductor 166.

The speed error signal in conductor 166 is applied through amplifier 168 and limit circuitry 170 to conductor 69 to operate function generator 94 and power supply 66 to provide a direct current of the required magnitude from power supply 66. The speed error signal in conductor 69 is also applied to oscillator 126 to alter the frequency of the electrical energization of stator winding 26 established by the signal in conductor 138 by an amount which will establish the necessary slip frequency in motor 22. The concurrence of the required magnitude of stator current and the necessary slip frequency will provide an output torque condition in motor 22 tending to reduce the speed error.

The torque output condition of motor 22 is controlled by the above described circuitry so that the motor output torque, as determined by the current and slip frequency energization of motor 22, acts to maintain the speed of motor 22 at the level desired by the setting of potentiometer 162. Thus, under motoring conditions, if the speed of rotor 42 should fall from the regulated value, the signal in conductor 154 will decrease. An increased speed error signal will appear in conductors 166 and 69 due to the summation occurring at summing junction 156 between the signal in conductor 154 and the signal in conductor 158. The increased signal in conductor 69 will cause power supply 66 to increase current 21. The signal in conductor 63 to oscillator 126 will cause the latter to increase the rotor slip frequency which, along with the increased current 21, increases the output torque of motor 22 to restore the speed of rotor 42 to the regulated value. Similar, but opposite, operation occurs when the rotor speed increases over the regulated value and analogous operation occurs during regenerative operation of motor 22.

In the event of an excessive speed error signal, limit circuit 170 limits the magnitude of the signal in conductor 69. This limiting operation limits the maximum output torque of motor 22 and maintains this maximum output torque for the duration of the excessive speed error signal condition. It is important to note that it is the signal in conductor 69 that is subjected to the limiting action. This insures that the operation of power supply 66 and inverter 96 are simultaneously and coordinately controlled under limit conditions thereby to maintain the maximum output torque. Limiting the maximum magnitude of the stator current prevents excessive current conditions in the motor and control. However, unless the slip frequency is also simultaneously and correspondingly limited, a precipitous decrease in torque will occur as the slip frequency rises. This undesirable degenerative condition is avoided and high torque is maintained by placing the limit on the signal in conductor 69, thereby maintaining the desired relationship between stator current and motor slip frequency. While the use of a single limit circuit 170 has been found to be most desirable for use in motor control 20C, it will be appreciated that separate limit circuits may be used to limit slip frequency and stator current, if desired. The operation of such separate limit circuits must be coordinated in order to maintain the necessary simultaneousness in limiting action.

Motor control 20 contains function generator 130 which controls the amount of advancement or retardation of the firing pulses of oscillator 126 and the corresponding phase displacement of the current energization of stator winding 26. The output signal of limit circuit 170 in conductor 69 is provided to the input of function generator 130 for this purpose. Both function generators 94 and 130 are operated by the signal in conductor 69.

A speed regulated motor control for a synchronous reluctance motor can be obtained by making the torque command signal proportional to a speed error signal. For this purpose a speed reference signal is established at the wiper 160 of potentiometer 162 and a speed feedback signal is provided from tachometer generator 137 coupled to rotor shaft 59 of motor 56 in conductor 154. The speed error signal in conductor 166 is applied through amplifier 168, limit circuitry 170, and conductor 69 to function generators 94 and 130 to control the output torque of motor 56 in accordance with the speed error signal in conductor 166 to maintain the speed of motor 56 at a level corresponding to the speed reference signal. If desired, the pulse output signal in conductor 152 may be utilized at a digital indication of motor speed for use with a speed reference means of the digital type.

The purpose of the subject invention is to provide a drive which is limited in maximum output horsepower throughout the operating range of the motor 22. The motor can be operated under any conditions within the maximum horsepower rating but cannot exceed the maximum horsepower rating. Thus the user cannot abuse the equipment.

Speed error signal 168 is passed through a limit circuit 170 to limit its magnitude. Thereafter the voltage output signal from speed error amplifier 168 is passed through a resistor 500 inserted in conductor 63 which converts the voltage output into a current signal. The output of resistor 500 is a current signal proportional to a predetermined slip frequency desired to be generated in motor 22. A signal proportional to the rotor frequency of motor 22 is generated by tachometer 137. This signal is passed through resistor 502 and provides a current signal proportional to rotor frequency in conductor 138. FIG. 1 shows a summing junction 504 for conductor 63 and 138, whereas the referenced application shows separate supply of the signals to oscillator 126. Resistor 527 is a feedback resistor for oscillator 126. In FIG. 1 oscillator 126 is an operational amplifier. The input of the operational amplifier is held at ground potential which facilitates the summing of the current signals. The output of oscillator 126 is the signal corresponding to the electrical frequency generated in the stator which is supplied to inverter 96 to energize the stator winding 26 of motor 22.

Figure 2:
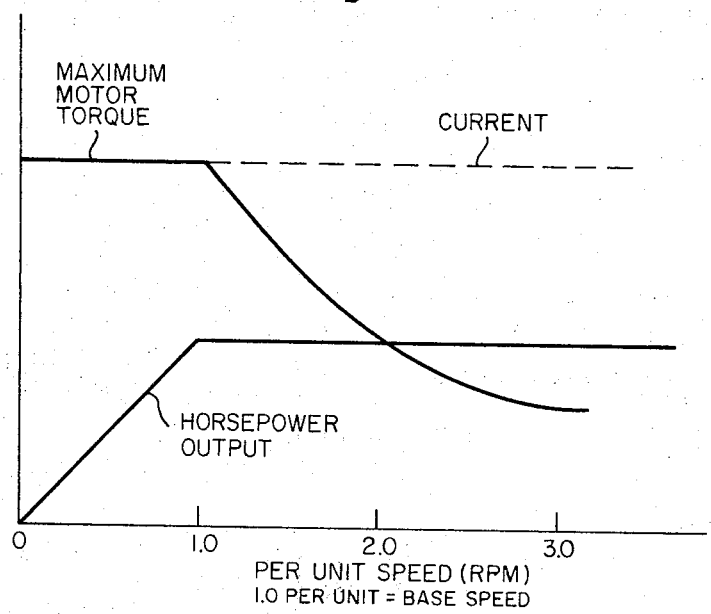
FIG. 2 is a graph showing the relationship between the horsepower output of the motor and motor torque as a function of motor speed.

Turning now to FIG. 2 there is shown the operating characteristic of maximum horsepower operation. Up to a predetermined speed of one on a per unit basis, the horsepower output of the motor increases. A speed of per unit 1 is termed base speed, and thereafter the horsepower of the motor is maintained at a constant maximum level. The base speed is selected as a matter of design choice. Between zero and per unit 1 speed, the torque of the motor remains constant at a maximum level so that increases in motor speed produces increases in horsepower output. In order to maintain a maximum horsepower with increasing speed, the motor torque must decrease hyperbolically as shown in FIG. 2.

From the standpoint of operating phenomena in the motor it is important to note that constant horsepower operation of the motor requires constant AC voltage on the motor. In this respect the AC voltage applied to the motor resembles the armature voltage of the DC machine. However, with constant AC voltage applied to the machine, increases in motor speed reduce the motor flux. In order to maintain rotor current under reduced flux conditions, it is necessary to increase the rate at which the rotor bars cut the lines of stator flux. This necessitates that slip frequency must be increased in the machine.

The motor terminal voltage is examined by means of isolating transformer 506 connected to the stator winding 26A, B, C. The transformer secondary signal is filtered through a resistor capacitor network 508 and rectified by rectifier network 510 to provide a DC signal. This DC signal is combined with a reference formed of a Zener diode 512. A potentiometer 514 provides threshold adjustment for the Zener diode. Varying potentiometer 514 changes the speed at which constant horsepower control becomes operative and hence varies the maximum horsepower of output allowed. Additional filtering circuitry 516 is provided at the input of the Zener diode. The output of the Zener diode is provided to a pair of light emitting diodes 518 and 520 of optically coupled isolator 521. A pair of light emitting diodes is utilized to provide both motoring and regenerative operation.

A shunt is connected around resistor 500 in the output of speed error amplifier 168. This shunt comprises two parallel paths selected by diodes 522 and 524. A power circuit of a transistor 526 and 528 is connected in series with each of the diodes and the foregoing circuitry is coupled to a resistor 530. Resistors 500 and 530 thus form a variable resistance, the magnitude of which is determined by the conductive state of the two transistors 526 and 528. The conductive state of the transistors 526 and 528 is determined by the signal applied to the base terminals by light emitting diodes 518 and 520.

In operation, prior to the time at which the motor operates at base speed, no signal is provided from the Zener reference-voltage feedback signal. This causes a constant signal out of speed error amplifier 168 which maintains the torque at the maximum level and which causes a constant slip to be generated in the motor. This provides the predetermined operating characteristics up to base speed. Above base speed an error signal will be provided to light emitting diodes 518 and 520 which permits current to flow through one or the other of transistors 526 and 528. This current parallels the current flow through resistor 500 which is proportional to the predetermined slip frequency. The total resistance of parallel resistors 500 and 530 is thus reduced which increases the magnitude of the current signal proportional to slip frequency. This signal, applied to the input of oscillator 126 increases the electrical frequency of the energization of stator winding 26 and increases the slip frequency in the motor above the value it would otherwise have. This causes the necessary operation which maintains the desired rotor current in motor 22. As shown in FIG. 3, the slip frequency signal applied to the summing junction 504 is adjusted to increase linearly with speed above base speed.

I claim:

1. A motor control interposable between an electrical energy source and the stator winding of a self-excited alternating current induction motor for controlling the torque developed by the motor and for limiting the maximum horsepower output of the motor, said control comprising:
   a. first signal means for generating a torque command signal indicative of the desired motor output torque condition;
   b. second signal means coupled to the alternating current motor for providing a signal indicative of the rotor frequency of the motor rotor;
   c. frequency control means connectable to the stator winding of the motor for energizing the stator winding with a cyclical current, said frequency control means being coupled to said second signal means for establishing the frequency of the cyclical current in accordance with said rotor frequency signal, said frequency control means being further coupled to said first signal means for altering the established frequency of the cyclical current and the slip frequency of the motor in accordance with the torque command signal;
   d. power supply means connectable to the electrical energy source and coupled to said frequency control means for providing a regulatable current to the frequency control means, said power supply means being coupled to said first signal means for regulating the magnitude of the stator current as a predetermined function of the torque command signal; and
   e. means for limiting the output horsepower, said limiting means having an input coupled to the stator winding to receive the stator voltage and an output limiting command signal coupled to said frequency control means, said limiting command signal indicative of a rotor frequency and horsepower output in excess of a predetermined value, said frequency control means responding to said limiting command signal by increasing the slip frequency to maintain a maximum horsepower output and torque per ampere.

2. The motor control according to claim 1 wherein said output horsepower limiting means is further defined as a transformer means coupled to the motor for receiving the stator voltage, a rectifier means coupled to said transformer means for rectifying the signal indicative of the stator voltage and a variable resistance means coupled to said rectifier means for producing said limiting command signal proportional in magnitude to the output voltage of said rectifier means, said limiting command signal coupled to said frequency control means for altering the slip frequency of the motor above the magnitude it would otherwise have been only in accordance with the torque command signal.

3. The motor control as claimed in claim 2 and further including a bistable means coupled between said rectifier means and said variable resistance means, said bistable means conducting at a predetermined voltage corresponding to said predetermined rotor speed, said variable resistor means being operative whenever said bistable means is in a state of conduction.

4. The motor control as claimed in claim 3 and further including a filter means coupled between said transformer means and said rectifier means.

5. The device as claimed in claim 2 wherein said variable resistor means comprises an optically coupled isolator.

6. A method of producing a desired torque condition and a maximum torque per ampere and horsepower output in a self-excited alternating current motor having a stator winding energized by a stator current having a frequency characteristic, said motor having a motor flux controllable to a desired level by the magnitude of the stator current, said motor also including a rotor the rotary condition of which is definable in terms of a rotor frequency which is referenced to the stator winding, and said motor being capable of having a slip frequency therein, wherein said method comprises steps of:
   a. establishing the frequency of the stator current at a value equal to the algebraic summation of the existing rotor frequency and a slip frequency proportional to the torque being produced;
   b. concurrently establishing the magnitude of the stator current at a value tending to maintain the motor flux at the desired level during the production of motor torque; and
   c. concurrently increasing the slip frequency, whenever the rotor frequency exceeds a predetermined value, to limit the maximum horsepower output of the motor to a substantially constant value for all rotor frequencies in excess of said predetermined frequency.

* * * * *